(12) United States Patent
Kawasaki

(10) Patent No.: US 6,308,731 B1
(45) Date of Patent: Oct. 30, 2001

(54) VENT VALVE

(75) Inventor: Koichi Kawasaki, Kitakoma-gun (JP)

(73) Assignee: ITZ Corporation, Iba-Ken (JP)

( * ) Notice: Subject to any disclaimer, the term of this patent is extended or adjusted under 35 U.S.C. 154(b) by 0 days.

(21) Appl. No.: 09/588,371

(22) Filed: Jun. 7, 2000

(30) Foreign Application Priority Data

Jun. 25, 1999 (JP) .................................................. 11-180836
Mar. 15, 2000 (JP) .................................................. 12-072314

(51) Int. Cl.[7] .................................................. F16K 15/00
(52) U.S. Cl. .................................................. 137/526; 137/533.27
(58) Field of Search ................................ 137/533.27, 526

(56) References Cited

U.S. PATENT DOCUMENTS

| Re. 35,532 | * | 6/1997 | Duren | 137/526 |
|---|---|---|---|---|
| 4,398,557 | * | 8/1983 | Dugge | 137/526 X |
| 4,436,107 | * | 3/1984 | Persson | 137/526 X |
| 4,493,339 | * | 1/1985 | Porter, Jr. | 137/526 X |
| 4,518,014 | * | 5/1985 | McAlpine | 137/526 X |
| 4,535,807 | * | 8/1985 | Ericson | 137/533.29 X |
| 5,048,562 | * | 9/1991 | Frawley | 137/526 X |
| 5,706,854 | * | 1/1998 | Haynes | 137/526 |
| 5,836,345 | * | 11/1998 | Ericson | 137/526 X |
| 5,881,759 | * | 3/1999 | Andersson | 137/526 X |
| 5,960,823 | * | 10/1999 | Wilkins | 137/526 X |
| 5,971,014 | * | 10/1999 | Duren | 137/526 |
| 5,983,929 | * | 11/1999 | Andersson | 137/526 |

FOREIGN PATENT DOCUMENTS

| 1-35235 | 7/1989 | (JP) . |
|---|---|---|
| 1-37628 | 8/1989 | (JP) . |

* cited by examiner

*Primary Examiner*—John Rivell
*Assistant Examiner*—Meredith H. Schoenfeld
(74) *Attorney, Agent, or Firm*—Wenderoth, Lind, Ponack, L.L.P.

(57) ABSTRACT

A vent valve includes a main valve having a valve chamber provided therein with an inside annular valve seat and an outside annular valve seat, a valve body normally seated on the seats under its own weight and opened by atmospheric pressure in response to negative pressure, a water collecting groove formed outward of the outside annular valve seat, a connecting cylindrical part provided at a position deviating from an axis of the valve chamber for communicating with the valve chamber, and a communicating flow path formed along the axial direction of the valve chamber for allowing communication between the water collecting groove and an interior of the connecting cylindrical part.

28 Claims, 13 Drawing Sheets

VENT VALVE

BACKGROUND OF THE INVENTION

1. Field of the Invention

This invention relates to a vent valve which is connected, for example, to a vent pipe serving to discharge water for the purpose of relieving the negative pressure generated in the pipe and is made to permit removal of an inner part thereof for the sake of inspection, for example.

2. Description of the Related Art

A vent valve is intended to enable an expansion vent pipe laid inside a building to aspirate air, mainly during the discharge of water, without requiring the terminal of the pipe to open directly into the ambient air. It has been proposed in various valve constructions.

The vent valve illustrated in FIG. 21, for the purpose of precluding the phenomenon that a valve body 3 is disabled to produce a closing motion when the dew drops in a valve chamber 1 are suffered to freeze, adopts a construction having a groove 4 for collecting the dew drops. A flow path 6 establishes communication between the groove 4 and a body 5 having a pipe shape, and is consequently adapted to allow escape of the dew drops into the body 5. In this case, the flow path 6 is formed in the shape of a cave with the object of enabling concentric valve seats 2 and 7 to form simple annular circles.

JP-B-01-37,628 discloses an example of forming a flow path in the shape of a groove in addition to an example of forming it in the shape of a cave as in the example cited above. In the construction of this prior art, concentric valve seats do not form perfectly annular circles because the flow path of the shape of a groove is formed in the lateral direction on the concentric valve seats and the valve seats are partly cut by the flow path.

The safety valve disclosed in JP-B-01-37,628 has a cap adapted so as to be set fast around the cylinder of the valve for sealing the valve and, when necessary, removed from the cylinder. The connecting valve taught in JP-B-01-35,235 has a construction which is provided with a pipe connector extended from the main body of the connecting valve and joined by means of a screw to an external flow path.

In the case of the vent valve illustrated in FIG. 21, since it has the flow path 6 formed in the shape of a cave for the sake of securing the valve seats 2 and 7 which constitute annular circles, however, it requires a slide type metal die for forming the main body of the vent valve from a resin. The cost of the metal die inevitably results in boosting the cost of the vent valve. Further, since a housing 10 forming the valve chamber 1 must be segmented below the flow path 6, a fitting part 8 between the body 5 and the housing 10 necessitates junction by adhesion lest the segmenting part should be accidentally resolved during the course of working. The junction by adhesion, therefore, not only adds to the number of steps of production but also boosts the cost and entails the possibility that the dew drops will leak through the part of junction of the fitting part 8. The dew drops, when frozen, will expand the housing 10 and leak through the junction part. Further, since the fitting part 8 is exposed to the exterior through an insulating member 9, the vent valve possibly sacrifices airtightness, suffers the valve body 3 to actuate under only feeble negative pressure, and gives rise to leakage of offensive smell through this exposed part.

Since the fitting part 8 coupling the body 5 and housing 10 is joined thereto by adhesion lest the union should be accidentally resolved during the courseof working, inner parts of the valve body 3 are incapable of being taken out while in service to be inspected or repaired such as by washing.

The vent valve of JP-B-01-37,628, which has no need for the structure of a slide type metal die, is constructed to seal itself solely with the weight of the valve body by utilizing the elasticity of a rubber packing and, accordingly, is provided with a groove which is laid in the lateral direction on the annular circles of the valve seats. It, therefore, entails the problem that if the packing collides against the part embracing the groove, it will be prevented from manifesting a satisfactory elastic deformation to the valve seats. As a result, it will exhibit only an impaired property of following the valve seats, and rather suffers from degradation of the sealing property.

Further, notwithstanding that the cap is adapted to be removed from the housing, the prior art relevant to this vent valve discloses no technical matters concerning a means to attach and detach the cap or the ability of the cap to seal the housing. Even if the inner parts of the valve body are taken out and inspected, the cap and the valve body are devoid of means to follow one another. Thus, the vent valve is at a disadvantage in requiring the cap and the valve body to be removed by operations performed independently of each other and compelling the operator to carry out extremely troublesome works.

When an instrument (vent valve) is installed at the terminal of an expansion vent pipe inside a building, the building is expected to be furnished with an inspection hole for permitting inspection of the instrument. The conventional instrument of this sort is either incapable of being disassembled at all for inspection or capable of being disassembled veritably incompletely as pointed out above.

Recently, therefore, the practice of first providing the vent pipe at the terminal thereof with a removable tube, disposing a given instrument (vent valve) in such a manner as to be attached to or detached from the removable tube and, when the instrument stands in need of a repair work, effecting replacement of the instrument with a spare one through the removable tube has been in vogue. This method, however, does not deserve designation as a rational approach because the removable tube calls for extra cost.

The connecting valve according to JP-B-01-35,235, on reaching the point where it is required to be replaced on account of the wear of the interior thereof, must be replaced wholly together with the joint of the pipe connector, and consequently entails an otherwise unnecessary cost. Further, since this connecting valve is provided below an external ring and near a valve seat with a connecting part which operates with a screw, it has the possibility that the dew drops will leak through the connecting part and the dew drops, when frozen, will expand the outer ring and leak through the connecting part.

This invention has been perfected as a result of a diligent study pursued in view of the true state of the prior art mentioned above. It is an object of this invention to provide a vent valve which, by deflecting the axis of a connecting pipe connected to a vent pipe used for discharging water from the axis of a valve chamber to thereby allow formation of a flow path serving to establish communication between a water collecting groove in the valve chamber and the connecting pipe by means of a simple two-plate type metal die, is enabled to lower the cost of manufacture, manifest a satisfactory ability to seal, prevent inner parts from producing defective functions, and make effective use of the space for installation. It is also an object of this invention to rely on the simplicity of construction to facilitate the operation of disassembling the inner parts. Another object of this invention consists in providing a vent valve which excels particularly in the tightness of its seal and features the fact that a small space suffices for its installation in addition to being at an advantage in obviating the necessity for replacing the valve wholly and facilitating the operation of cleaning and replacing the mechanism in the valve after the valve has been worn out.

SUMMARY OF THE INVENTION

To attain the above objects, according to this invention, there is provided a vent valve comprising a main valve having a valve chamber provided therein with an inside annular valve seat and an outside annular valve seat, a valve body normally seated on the seats under its own weight and opened by atmospheric pressure in response to negative pressure, a water collecting groove formed outward of the outside annular valve seat, a connecting cylindrical part provided at a position deviating from an axis of the valve chamber for communicating with the valve chamber, and a communicating flow path formed along the axial direction of the valve chamber for allowing communication between the water collecting groove and an interior of the connecting cylindrical part.

The above and other objects, features and advantages of this invention will become apparent from the detailed description to be given herein below with reference to the accompanying drawings.

DESCRIPTION OF THE PREFERRED EMBODIMENTS

Various preferred embodiments of the vent valve according to this invention will be described in detail below with reference to FIG. 1–FIG. 20.

The vent valve is an implement which fulfills the function of introducing into a draining vent pipe the air for smoothing the flow of waste water in the draining vent pipe and the function of preventing the draining vent pipe from leaking the offensive odor of the sewer gas, and discharges the role of enabling the terminal opening part of the vent pipe, which is generally required to be opened outside a building, to be handled inside the building. Since this vent valve does not expose any projection at the terminal of the pipe while in service, it is at an advantage in not impairing the appearance of the building and encouraging simplification of the work of perforating a roof or an outer wall of the building for ventilation. It is used as perpendicularly set on the upper part of an expansion vent pipe extended above a vertical drain pipe or on a vent pipe disposed halfway in the length of a horizontal drain pipe in a building.

Figure 1:
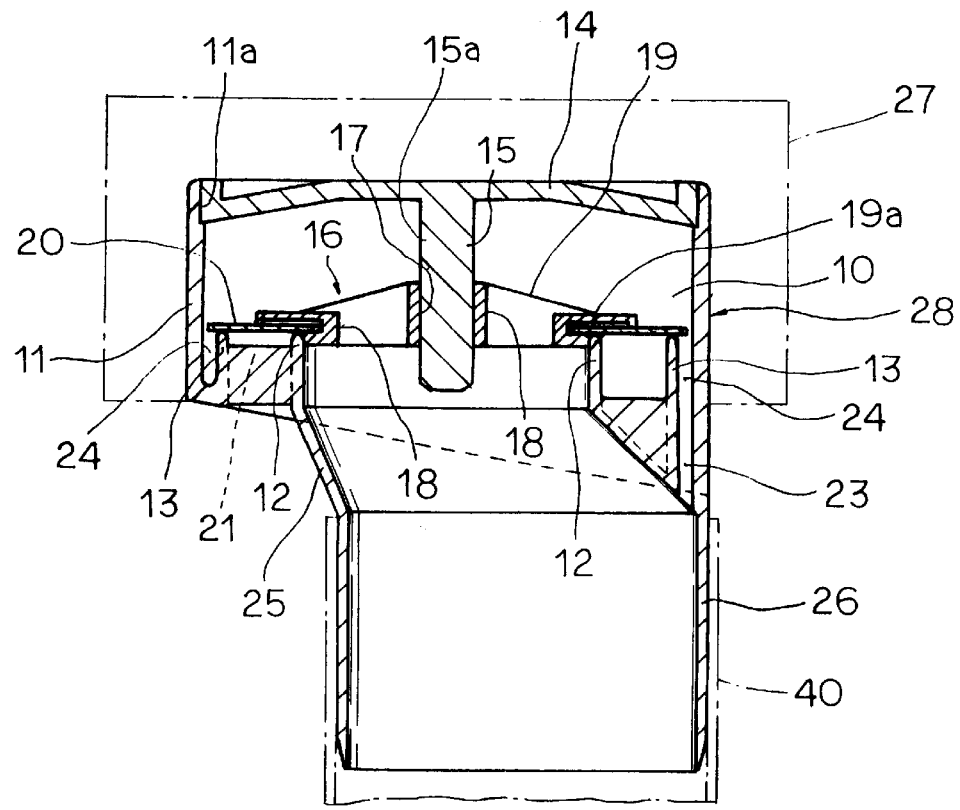
FIG. 1 is a longitudinal section illustrating a vent valve taken as one embodiment of this invention and shown in a closed state.

FIG. 1–FIG. 5 illustrate one embodiment of the vent valve according to this invention. With reference to FIG. 1, a valve chamber 10 is formed as defined by a cylindrical part 11 of a main valve 28 and adapted to constitute an inner annular valve seat 12 and an outer annular valve seat 13 concentrically to the cylindrical part 11.

A cap 14 of the shape of a disc is removably disposed on an upper opening part 11a of the cylindrical part 11, and a guide shaft 15 is formed as suspended from the central part of the lower side of the cap 14. On this guide shaft 15, four radially projected ridges 15a are formed as disposed in radial directions. This main valve 28 and the cap 14 and a circular elevating member 19 used in this embodiment are formed of a synthetic resin.

Figure 2:
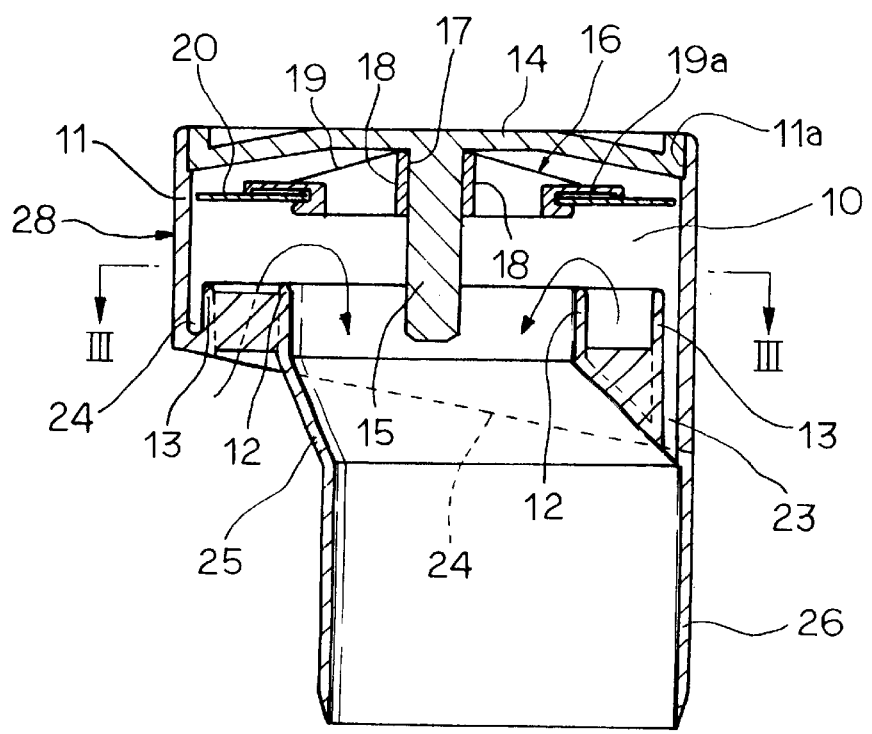
FIG. 2 is a longitudinal section illustrating the vent valve of FIG. 1 as posed in an open state.

In the valve chamber 10, a valve body 16 is disposed in a freely elevating state. This valve body 16 is normally seated under its own weight on the annular valve seats 12 and 13. When the interior of the tube develops negative pressure, the valve body 16 is lifted and released from the seats in response thereto by the atmospheric pressure. This valve body 16 may be in any structure so long as the structure enables the valve body to manifest the function mentioned above. The valve body 16 in the present embodiment is possessed of a circular guide hole 17 in the central part thereof as illustrated in FIG. 1 and FIG. 2. On the outer peripheral surface of the elevating member 19 containing a plurality of communicating holes 18, a fitting groove 19a is formed. An annular flexible member 20 formed of a material such as rubber is fitted to the fitting groove 19a. The circular guide hole 17 of the elevating member 19 is fitted on the guide shaft 15. The valve body 16 is vertically reciprocated as guided by this shaft 15. When the valve body 16 is seated by its own weight on the annular valve seats 12 and 13, the flexible member 20 is caused to close the vent valve as depressed in a bent state against the annular valve seats 12 and 13. The guide shaft 15 is suspended to a position lower than the annular valve seats 12 and 13 as illustrated in FIG. 1. The flexible member 20 has an outside diameter which is smaller than the inside diameter of the cylindrical part 11 lest it should touch the cylindrical part 11.

An air inlet 21 communicating with the ambient air is disposed between the annular valve seats 12 and 13. A plurality of retaining leaves 22 (FIG. 3) are disposed pointing in radial directions between the annular valve seats 12 and 13. These retaining leaves 22 are disposed at a low position such that adjacent retaining leaves 22 gradually communicate with each other and allow the inflow of air as they approximate closely to a communicating flow path 23, which will be described more specifically below.

Figure 4:
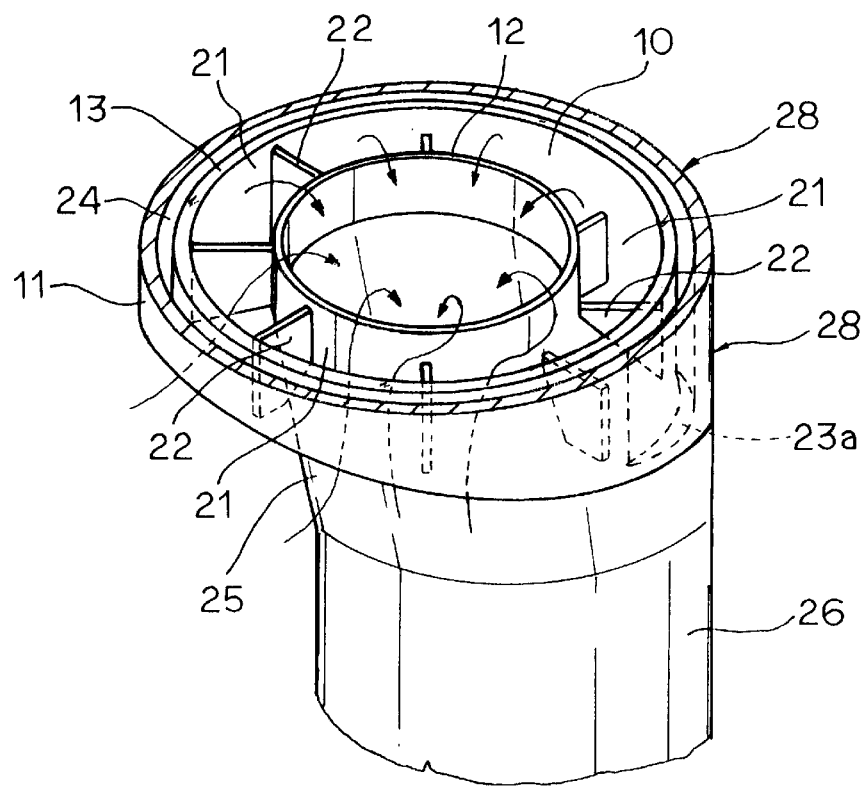
FIG. 4 is a partially cutaway perspective view of the section taken through FIG. 3 along line II—II as viewed in an oblique direction.
Figure 5:
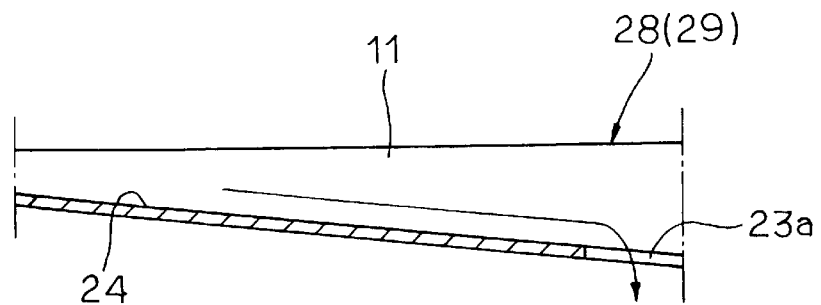
FIG. 5 is an expansion plan view illustrating one half of a water collecting groove in an expanded state.

Further, in the outer peripheral part which surrounds the outer annular valve seat 13, an annular water collecting groove 24 for collecting the dew drops arising inside the valve chamber 10 is formed. This water collecting groove 24 is so constructed as to be inclined downward until it reaches the communicating flow path 23 as shown in FIGS. 4 and 5. Though the water collecting groove 24 is capable of collecting water even when it is laid horizontally, it manifests an improved efficiency in the collection of water when it is inclined as in the present embodiment. Further, when the retaining leaves 22 on the communicating flow path 23 side are so formed that the upper ends thereof will fall below the upper end faces of the annular valve seats 12 and 13, the relevant sites secure the required air passing property.

At a position deviating from the axis of the valve chamber 10, a connecting cylindrical part 26 connected to the upper end of a draining vent pipe 40 is integrally formed with the valve chamber 10 via a communicating cylindrical part 25.

Figure 3:
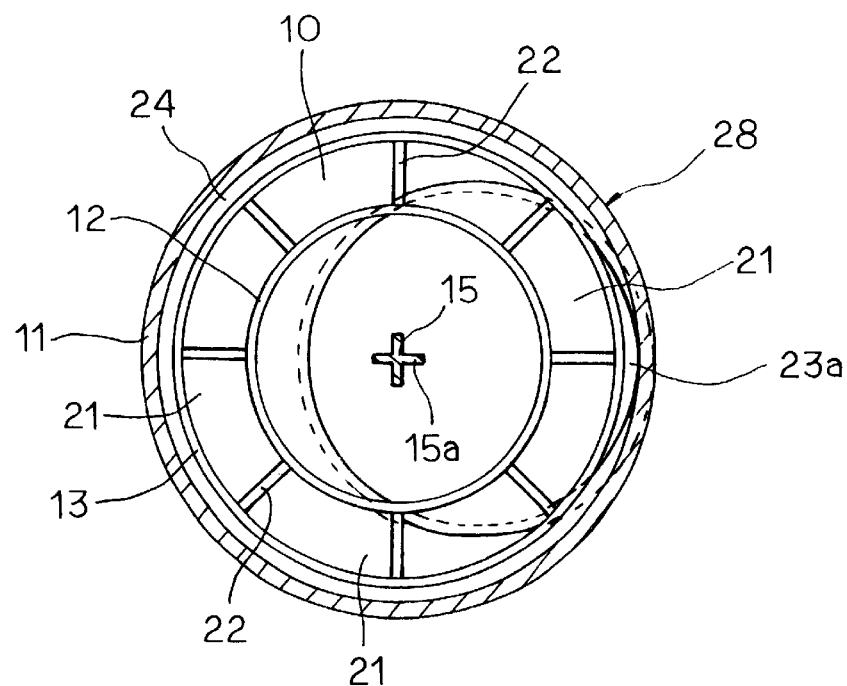
FIG. 3 is a cross section taken through FIG. 2 along line III—III.

The communicating flow path 23, as illustrated in FIG. 3 and FIG. 4, forms a flow path hole 23a in a crescent shape on one end side of the lower position of the water collecting groove 24 so as to give rise to a flow path which penetrates the part in which the water collecting groove 24 and the inside diameter part of the connecting cylindrical part 26 overlap.

This communicating flow path 23 does not need to be limited to the construction as in this embodiment, but is only required to give rise to the communicating flow path 23 at the position in which a suitable position of the water collecting groove 24 and the inside diameter part connecting cylindrical part 26 overlap. The position is arbitrary, depending on the mode of embodiment of the invention.

Reference numeral 27 shown in FIG. 1 denotes an insulating member for covering the cylindrical part 11 of the main valve 28. This insulating member 27 is provided for the purpose of preventing the vent valve from forming dew drops or from being frozen.

Now, the operation of the embodiment illustrated in FIG. 1–FIG. 5 will be described below.

With reference to FIG. 1, when the pressure in the draining vent pipe to which the vent valve is connected equals the atmospheric pressure, the valve body 16 is seated by its own weight on the valve seats 12 and 13, and the flexible member 20 of this valve body 16 keeps the air inlet 21 in a closed state.

When the interior of the valve chamber 10 develops negative pressure relative to the atmospheric pressure after an implement such as a toilet basin discharges the waste water subsequent to the service thereof and the volume of this negative pressure grows higher than the seating pressure caused by the valve body 16 under its own weight, the valve body 16 is lifted by the atmospheric pressure to the extent of opening the inlet 21 and admitting the ambient air therethrough. The result is that the loss of the seal inside the drain trap disposed in the implement will be allayed so much as to preclude breakage of seal. When the interior of the pipe subsequently resumes positive pressure, the valve body 16 is seated to close the inlet 21.

When cold or hot water is discharged into the draining vent pipe, the interior of the valve chamber 10 of the vent valve gives rise to dew drops. These dew drops fall from the interior of the valve chamber 10 onto the water collecting groove 24, advance through the water collecting groove 24, which is inclined, and flow down from the communicating flow path 23 into the connecting cylindrical part 26. As a result, the possibility that the dew drops in the valve chamber 10 will freeze the valve body 16 and render the valve body 16 incapable of fulfilling the function thereof can be infallibly precluded.

Further, since the communicating flow path 23 which serves to establish communication between the water collecting groove 24 and the interior of the connecting cylindrical part 26, is formed along the axial direction of the valve chamber 10, the vent valve is at an advantage in not merely facilitating the descent of the dew drops but also allowing the vent valve, when formed of a synthetic resin, to be molded with a simple two-plate metal die and enabling the cylindrical part 11 on the communicating flow path 23 side and the connecting cylindrical part 26 to be formed in a rectilinear state. In other words, since the cylindrical part 11 on the communicating flow path 23 side can be formed in a shape not thrusting out of the connecting cylindrical part 26, the connecting cylindrical part 26 can be likewise connected as held in contact with the wall surface when a draining vent pipe is set in contact with the wall surface, and the produced vent valve is consequently enabled to utilize the space efficiently.

FIG. 6–FIG. 13 illustrate another embodiment of the vent valve according to this invention. In these diagrams, like parts involved in the preceding embodiment are denoted by like reference numerals. These parts will be omitted from the following description to avoid repetition.

Figure 6:
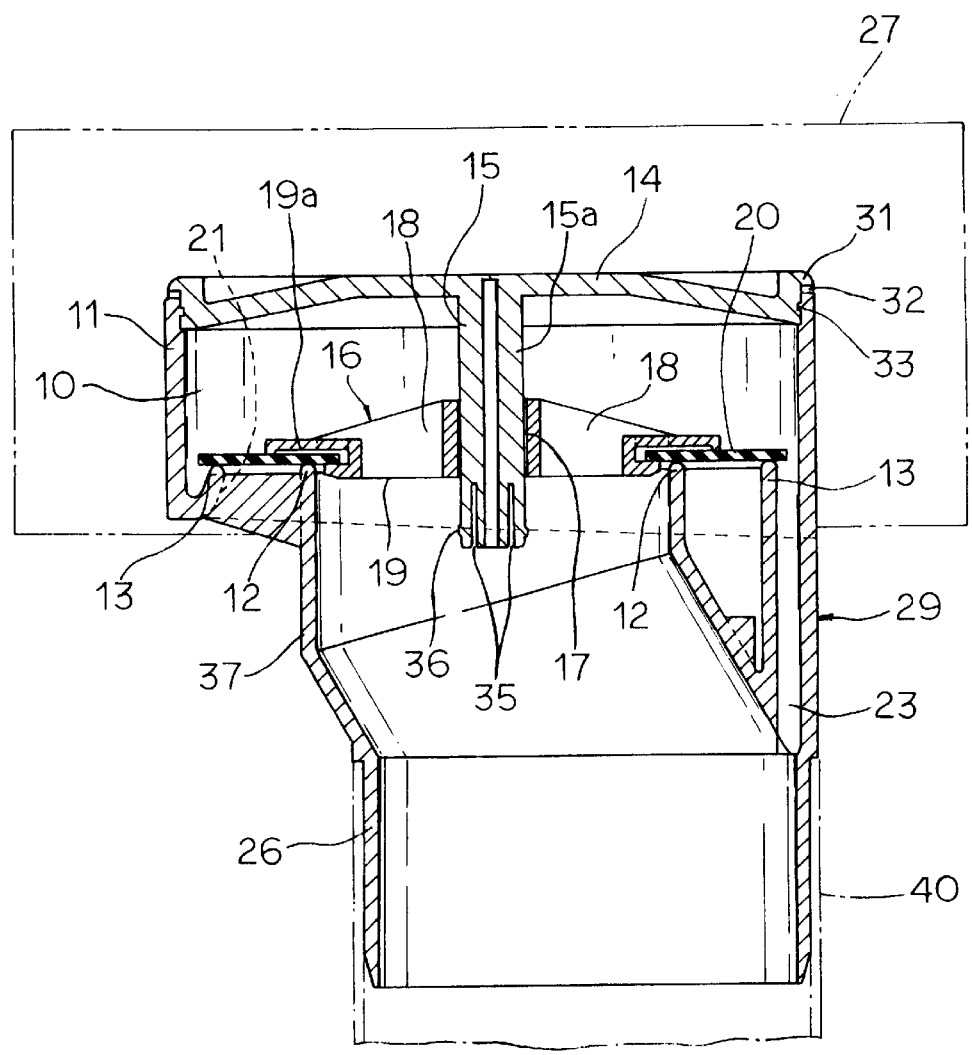
FIG. 6 is a longitudinal section illustrating a vent valve taken as another embodiment of this invention.
Figure 7:
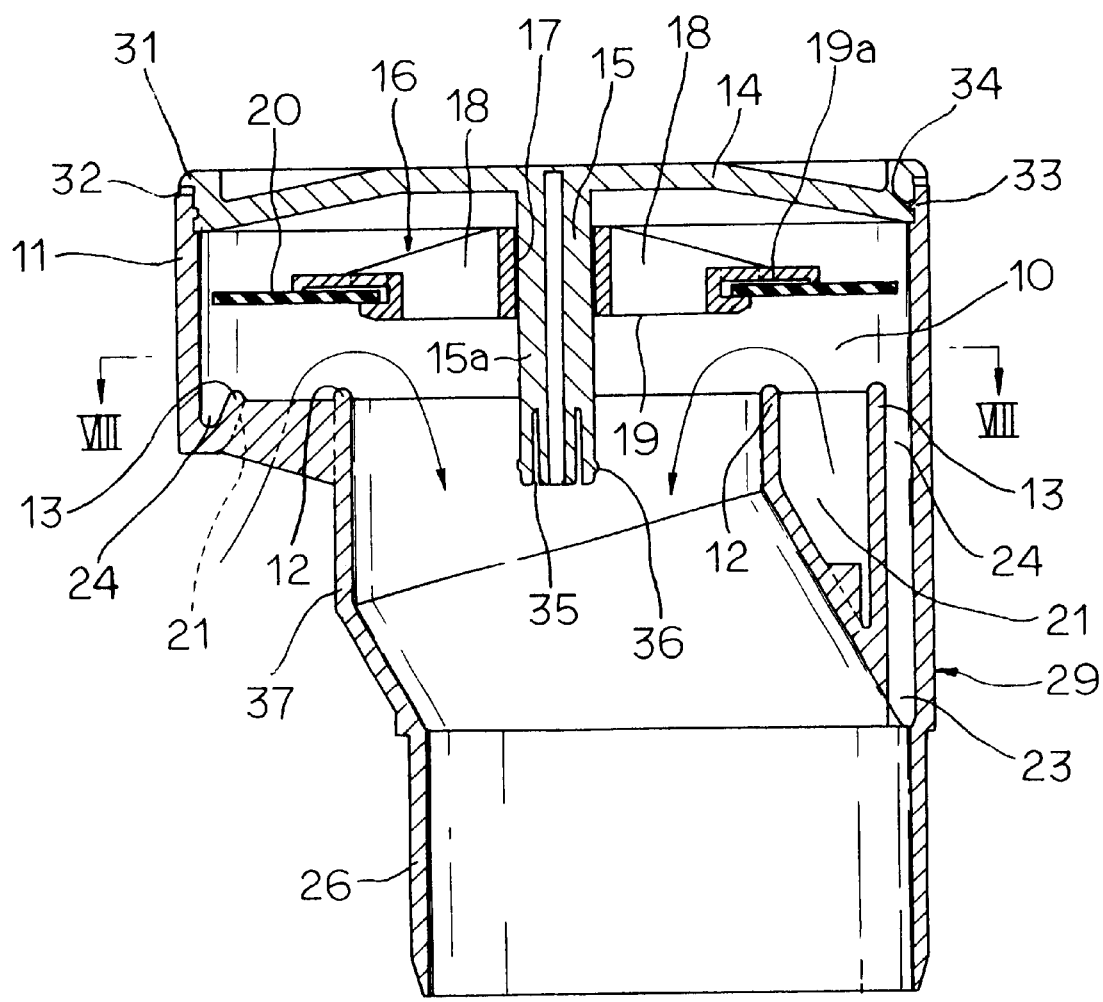
FIG. 7 is a longitudinal section illustrating the vent valve of FIG. 6 as shown in an open state.
Figure 8:
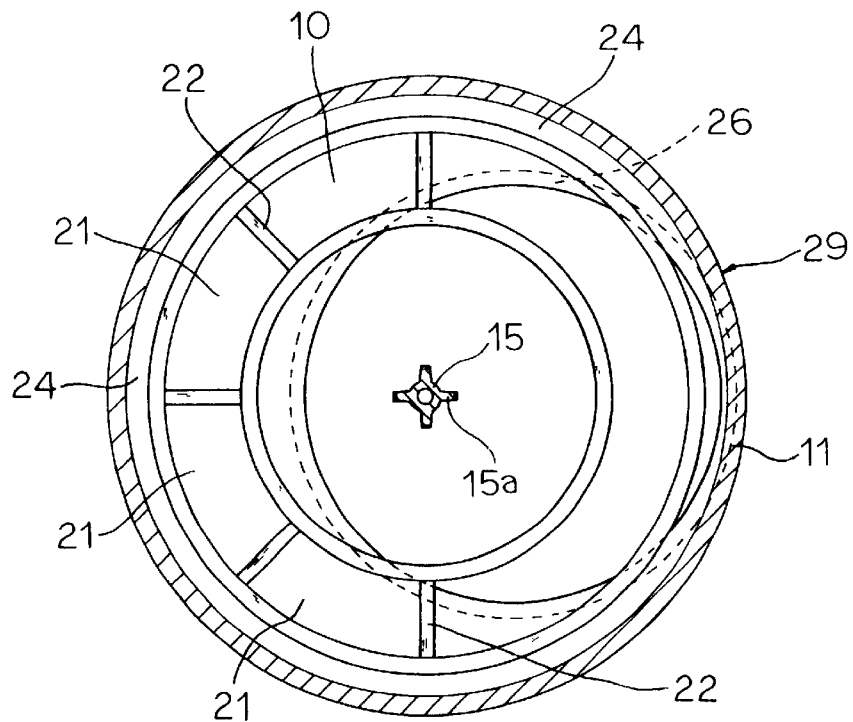
FIG. 8 is a cross section taken through FIG. 7 along line VIII—VIII.

With reference to FIG. 6, reference numeral 29 denotes a main valve. The valve chamber 10 of this main valve 29 is tightly sealed at the opening part 11a (FIG. 9) of the cylindrical part 11 with the cap 14, which has the guide shaft 15 suspended therefrom and is removable from the main valve 29.

Figure 13:
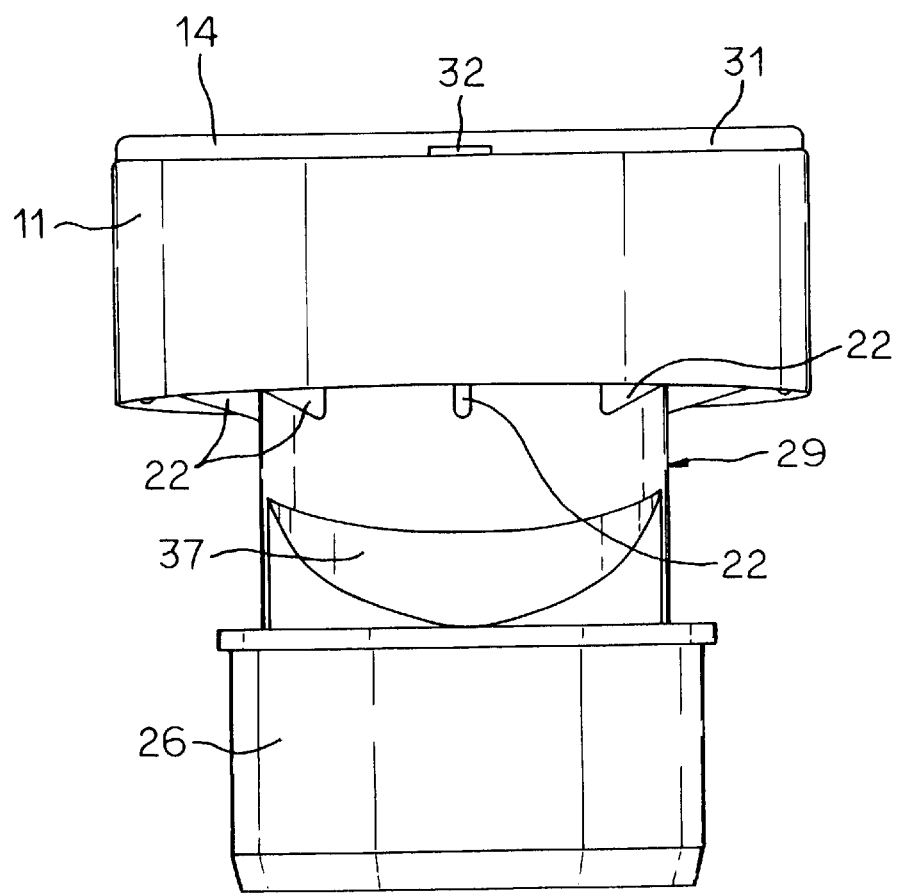
FIG. 13 is a left side view of the vent valve shown in FIG. 6.
Figure 14:
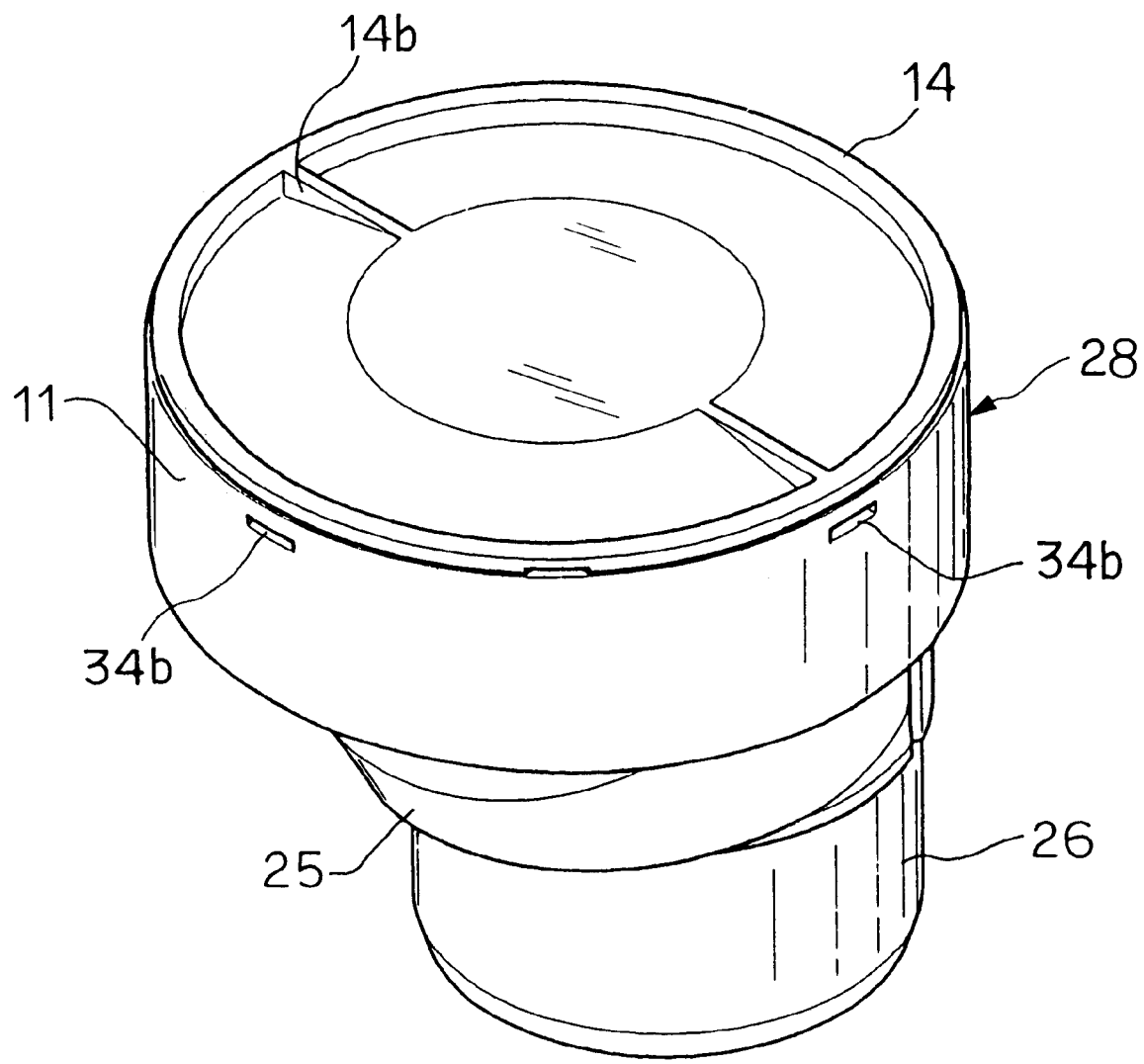
FIG. 14 is a perspective view of a vent valve taken as still another embodiment of this invention.

The structure for the removal of the cap 14 is completed by forming an annular flange part 31 along the outer edge part of the cap 14, cutting a notch part 32 for the insertion of a tool (not shown) in the flange part 31 as illustrated in FIG. 13, forming an undulating annular projecting part 33 on the lateral surface of the cap 14, and forming, on the inner periphery of the opening part 11a, an undulating annular engaging part 34 (FIG. 7) adapted to be meshed with the annular projecting part 33. By making and breaking the union between this annular projecting part 33 and the annular engaging part 34, therefore, it is made possible to attach the cap 14 to and detach it from the valve chamber 10 with airtightness retained between the valve chamber 10 and the cap 14. A suitable construction can be adopted for this structure which is used for the removal of the cap. The airtightness can be retained, for example, by the use of an undulating or tapered construction.

The guide shaft 15 of the cap 14 snaps into fitting engagement with the valve body 16 when it is inserted into the circular guide hole 17 of the elevating member 19 and partially comes into engagement with the valve body 16 when the cap is detached from the main valve 29. This engagement construction is to be disposed at a position where the valve body 16 is not easily dropped under its own weight, and is not to be affected by the vertical motion of the elevating member 19 during the operation of the valve body 16.

Figure 10:
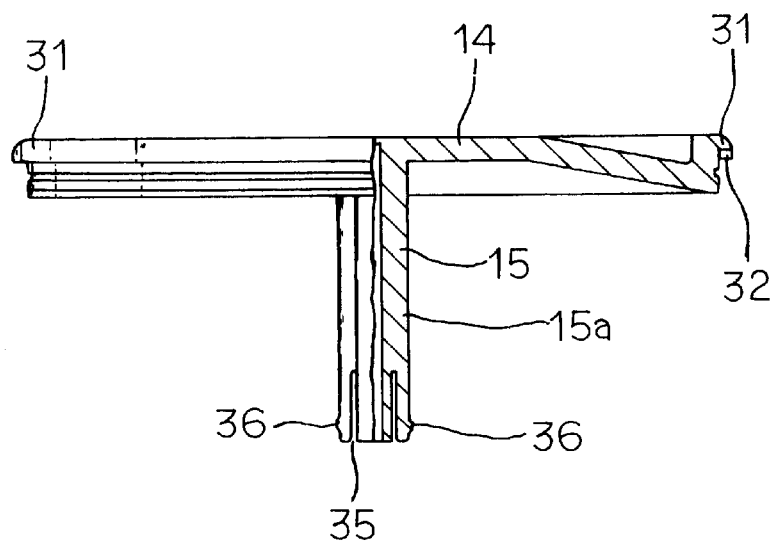
FIG. 10 is a halved section of the cap of FIG. 6.
Figure 11:
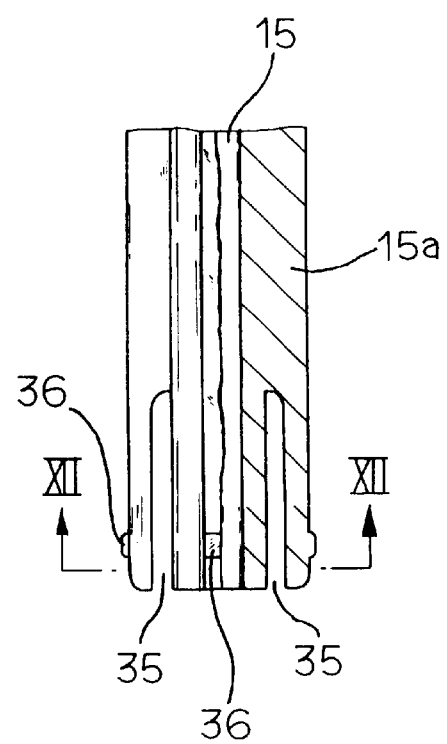
FIG. 11 is a partially cutaway magnified view of FIG. 10.
Figure 12:
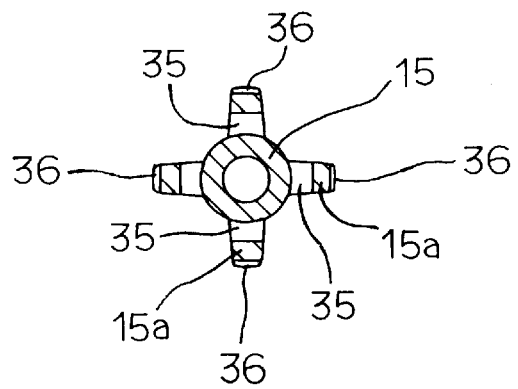
FIG. 12 is a section taken through FIG. 11 along line XII—XII.

This engagement construction will be specifically described below sequentially with reference to FIG. 10–FIG. 12.

A notched groove 35 is formed in the lower position of each of the radially projected ridges 15a positioned on the outer periphery of the guide shaft 15. A projecting part 36 is disposed on the outer periphery of the lower part of the radially projected ridge 15a so that the valve body 16 may not slip down the guide shaft 15 under its own weight, but may come into engagement with the guide shaft 15. The guide shaft 15 may enter into the guide hole 17 because the leading terminal of the guide shaft 15 is allowed, by the notched groove 35, to bend toward the center thereof, and the projecting part 36 may return to its home position after the insertion of the guide shaft 15 is completed.

In the present embodiment, similar to the preceding embodiment, the main valve 29 is formed at a position deviating from the axis of the valve chamber 10 and integrally with a connecting cylindrical part 26 which is connected to the upper end of the vent pipe 40 for discharging water through a communicating cylindrical part 37.

In this embodiment, since the communicating cylindrical part 37 and the connecting cylindrical part 26 have substantially equal inside diameters, as illustrated in FIG. 6, the valve body 16 is uniformly depressed from the upper surface thereof when the pressure in the pipe equals the atmospheric pressure or grows to a positive pressure. The valve body 16 has the lower surface thereof exposed uniformly to the atmospheric pressure when the interior of the pipe generates a negative pressure. Thus, the valve body 16 is smoothly lifted to open the vent valve and admit the ambient air.

The vent valve in the embodiment illustrated in FIG. 6–FIG. 13 has the same operation and effect as that in the embodiment illustrated in FIG. 1–FIG. 5. The parts of this vent valve which produce different operations from the vent valve of the preceding embodiment will be described below.

Figure 9:
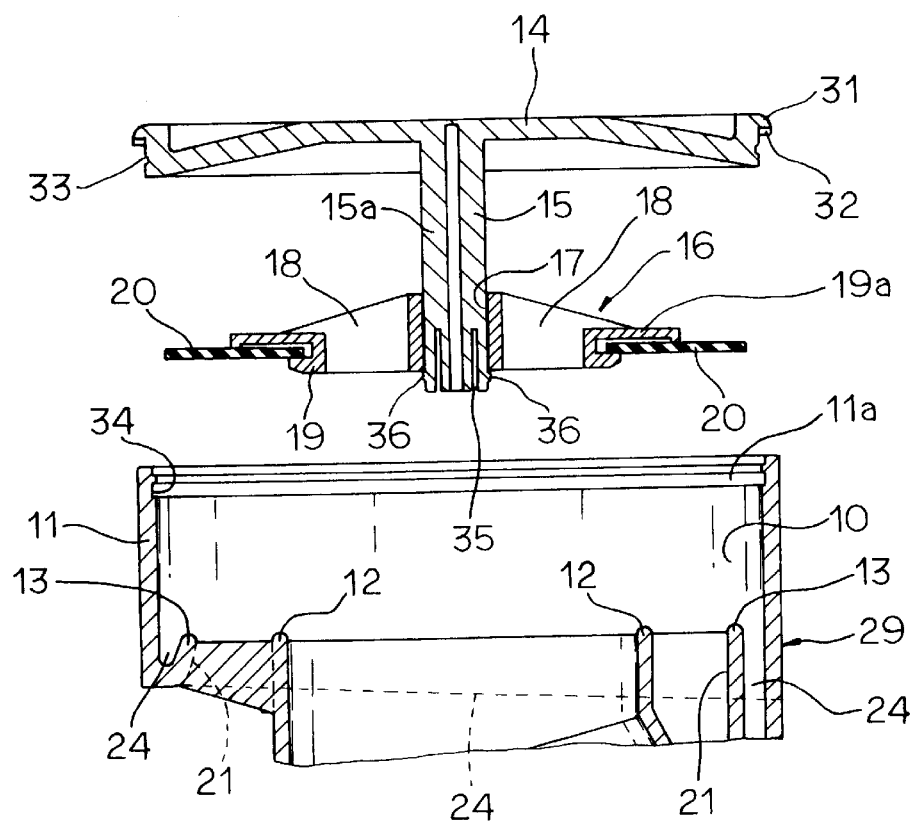
FIG. 9 is a partially cutaway longitudinal section illustrating the vent valve of FIG. 6 as shown in a state having a cap removed from position.

When the interiors such as of the valve seats of the main valve 29 and the inner parts of the valve body 16 are to be inspected, the valve body 16 remains on the main valve side when the cap 14 is removed in the embodiment of FIG. 1–FIG. 5. When the cap 14 is removed from the cylindrical part 11 by inserting a tool (not shown) into the notched part 32 of the cap 14, the valve body 16 can be drawn out simultaneously with the cap 14 because the projecting part 36 of the guide shaft 15 is brought into engagement with the guide hole 17 formed in the elevating member 19 of the valve body 16, as illustrated in FIG. 9. Thus, the interior of the main valve 29 can be inspected and cleaned and the valve body 16 can also be inspected and cleaned. When the valve body 16 is mounted in the valve chamber 10, it can be set at an appropriate position by simply fitting the cap 14 to the cylindrical part 11 of the valve chamber 10. In this case, the cap 14 is mounted easily and infallibly in the upper opening part of the main valve 29 while retaining the airtightness intact.

The construction for attachment of the guide shaft 15 of the cap 14 to the main valve 29 and the construction of engagement of the cap 14 with the valve body 16 illustrated in FIG. 6 can be applied to various embodiments of this invention. They can be extensively applied to the vent valve of the construction illustrated in the prior art described above. The vent valve of this invention cannot be accidentally disassembled even in the absence of the attachment of the cap 14 because the valve chamber is situated on the main valve 28 or 29 side, and the main valve 28 or 29 is nipped and the cap 14 is not nipped during the handling of the vent valve. The inspection can be carried out by removing the cap 14.

FIG. 14–FIG. 20 illustrate still another embodiment of the vent valve according to this invention. In the present embodiment, like parts to those shown in FIG. 6–FIG. 13 are denoted by like reference numerals. The overlapping parts will be omitted from the following description.

Figure 15:
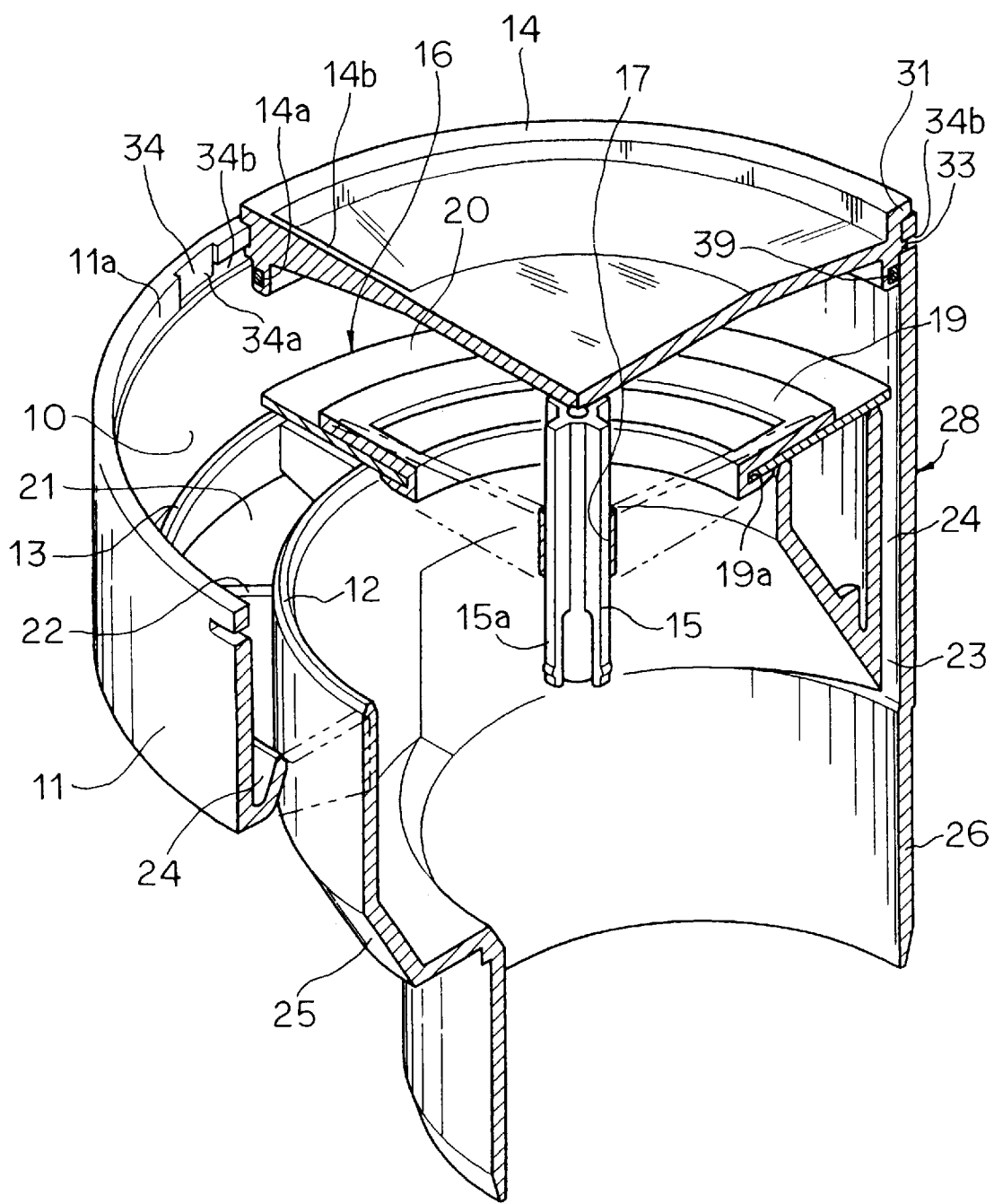
FIG. 15 is a partially cutaway magnified section of the vent valve of FIG. 14.
Figure 16:
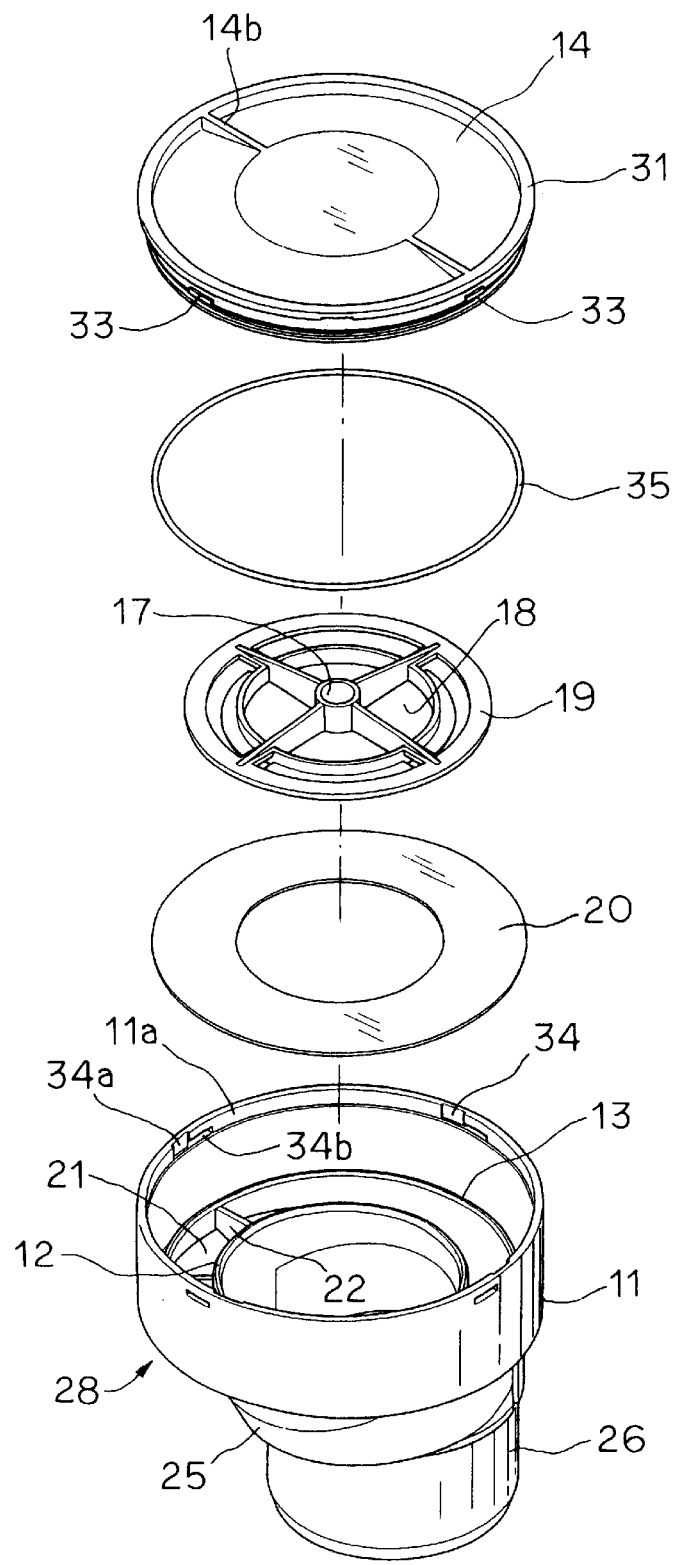
FIG. 16 is a referential diagram illustrating the vent valve of FIG. 14 posed in a disassembled state.

As shown in FIG. 15, the cap 14 sealing the valve chamber 10 in this embodiment forms an annular flange part 31 along its upper outer edge and an annular projecting part 33 on the lateral surface of its outer periphery. On the inner wall of the cylindrical part 11 in the proximity of the upper opening part 11a, there is formed an annular engaging part 34 that is notched in the shape of the letter L and adapted to engage with the annular projecting part 33. The annular projecting part 33 is so disposed as to be attached to and detached from the annular engaging part 34.

This engaging means will be specifically described below with reference to FIG. 19 and FIG. 20.

The annular engaging part 34 comprises a guide groove 34a and a stopping hole 34b. The groove and hole are formed by inserting a notch and a cut in the inner wall surface of the cylindrical part 11. The guide groove 34a is so disposed that the annular projecting part 33 may be inserted downward in the vertical direction from the opening part 11a side of the cylindrical part 11. The stopping hole 34b is so formed that the annular projecting part 33 inserted in the guide groove 34a may be rotated till it is brought to a stop.

Figure 17:
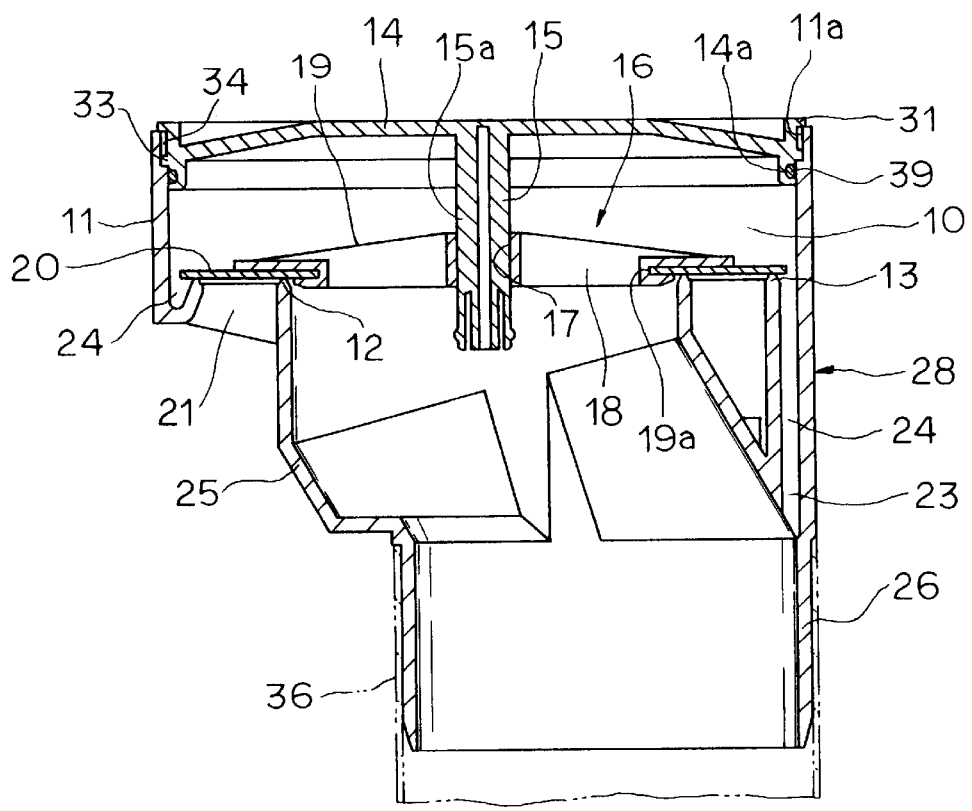
FIG. 17 is a longitudinal section of the vent valve of FIG. 14.
Figure 18:
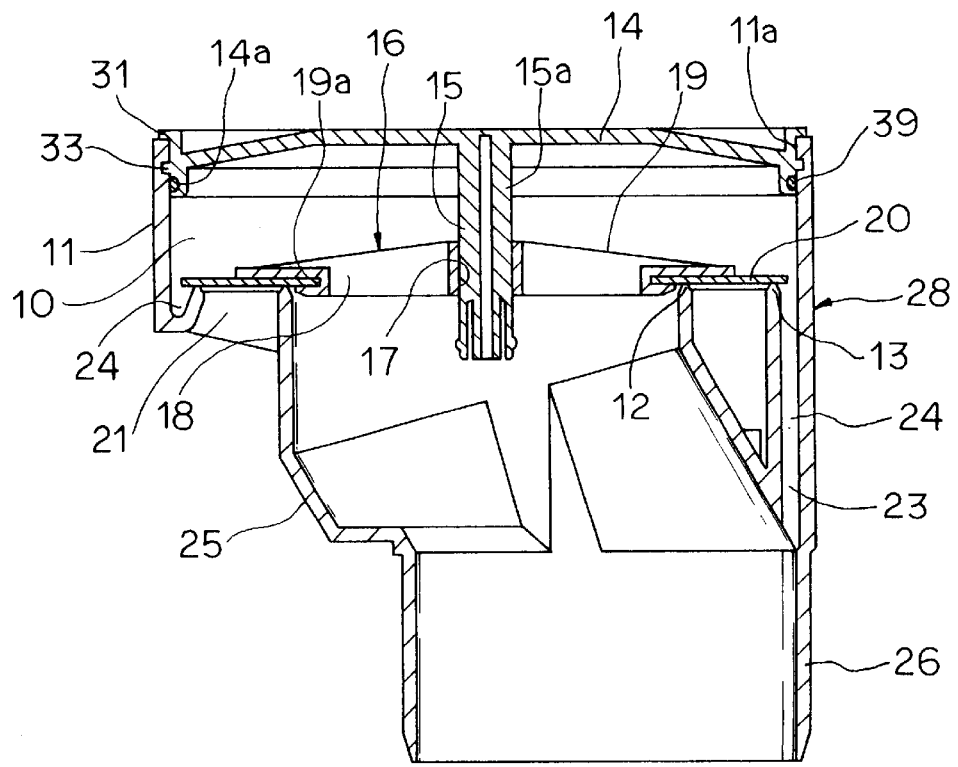
FIG. 18 is a longitudinal section illustrating the vent valve as posed in an actuated state.
Figure 19:
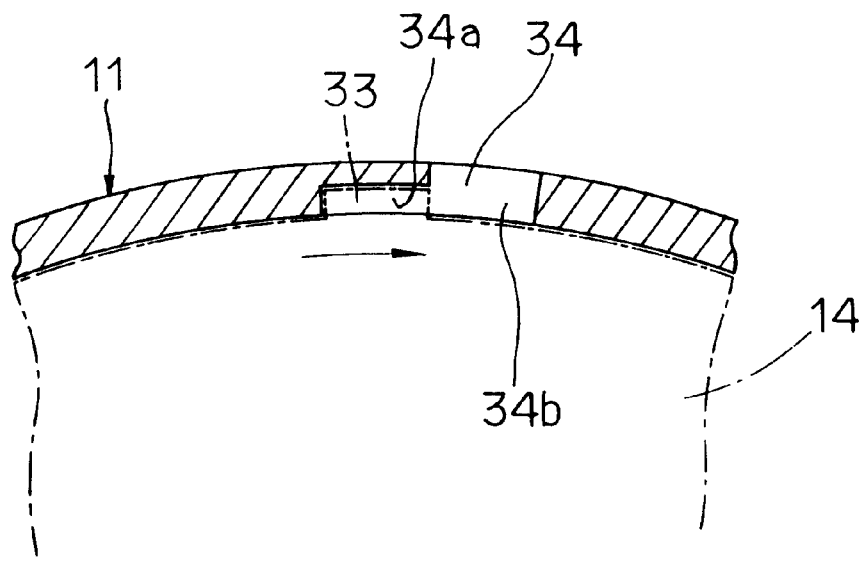
FIG. 19 is a partially magnified section illustrating the neighborhood of an engaging part.
Figure 20:
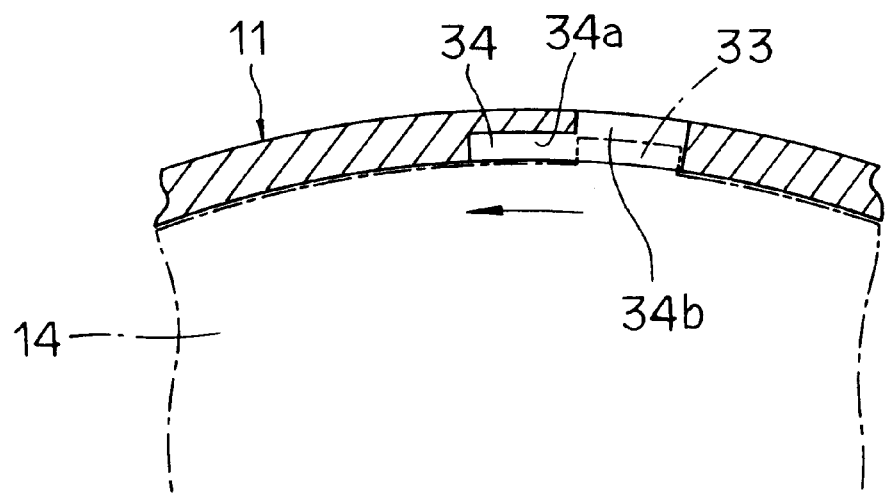
FIG. 20 is an explanatory diagram illustrating the cap of FIG. 19 as shownd in a rotated state.
Figure 21:
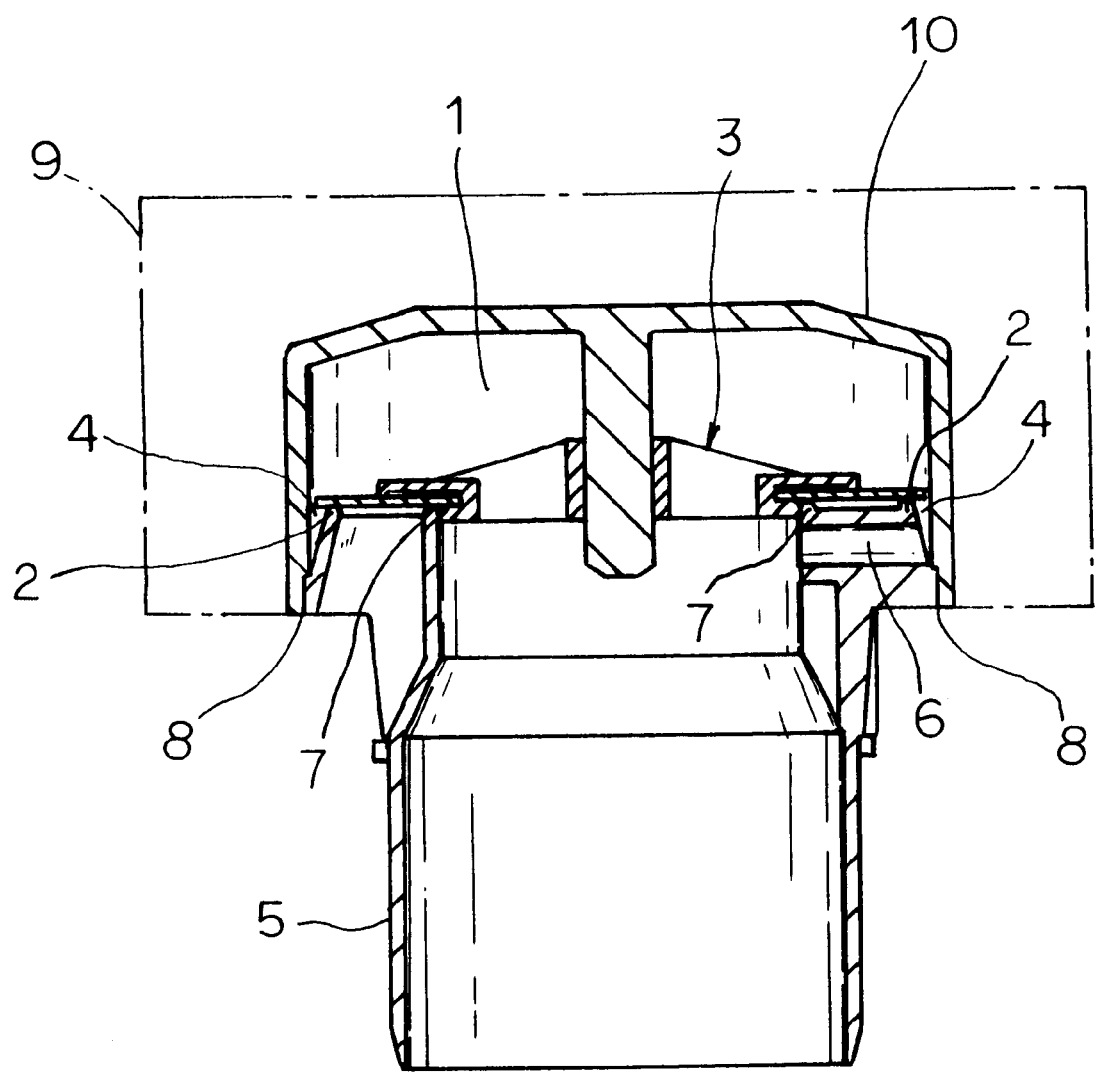
FIG. 21 is a longitudinal section illustrating an example of prior art vent valve.

When the annular projecting part 33 is set in position in the stopping hole 34b as illustrated in FIG. 19, it is brought into engagement in the vertical direction. Further, since a sealing member 39 (O ring) is mounted in a depressed part 14a of the cap 14 as shown in FIG. 17 so as to retain the tightness of the seal of the interior of the valve chamber 10 when the cap 14 is set in position in the upper opening part 11a, the sealing member 39 is brought into tight contact with the opening part 11a in consequence of the rotation of the cap 14. The cap 14, therefore, is attached tightly to the cylindrical part 11 and enabled to retain the seal tightness intact.

The attachment and detachment of the cap 14 is carried out by utilizing knurls 14b formed radially as ribs on the top side of the cap 14. When the cap 14 is to be removed, for example, first the cap 14 is rotated by an angle of about 10° in the present embodiment while keeping the knurls 14b depressed with the palm so as to break the fast attachment of the annular projecting part 33 to the stopping hole 34b, and then the cap 14 is pulled up in a substantially vertical direction while keeping the outer periphery of the cap 14 depressed with the finger tips. Thus, the annular projecting part 33 of the cap 14 can be passed through the guide groove 34a and removed.

Since the engaging means in the present embodiment is disposed in the upper part of the main valve 28, the cap can be removed without entailing possible leakage of the dew drops collecting in the collecting groove 24 to the exterior. Even when the dew drops freeze, the attachment and detachment of the cap can be implemented without being affected by the freezing of the dew drops.

Incidentally, the engaging means described above is intended to illustrate one example. It is to be understood as embracing a construction in which the cap is attached to the valve chamber by means of a screw.

Next, the operation of the embodiment illustrated in FIG. 14–FIG. 20 will be explained.

Since the vent valve of this embodiment has the annular engaging part 34 disposed on the inner peripheral surface of the cylindrical part 11 of the main valve 28 and has the annular projecting part 33 of the cap 14 disposed so as to be attached to and detached from the annular engaging part 34 of the approximate shape of the letter L, the cap 14 can be easily removed and the interior of the main valve 28 and the inner parts of the valve body 16 can be cleaned and replaced with spare ones.

Further, since the depressed part 14a is disposed on the lower periphery of the cap 14 and the sealing member 39 is disposed in this depressed part 14a, the cap 14 can be easily and infallibly attached to and detached from the interior of the valve chamber 10 with persistent tightness of seal as approximated closely to the opening part 11a of the main valve 28. Moreover, the seal tightness can be increased and the state of attachment can be stabilized because the cap 14 is attached as rotated to the main valve 28.

In the vent valve of the present embodiment, since the snap part of the guide shaft 15 is brought into engagement with the guide hole 17 formed in the elevating member 19 of the valve body 16 when the cap 14 is removed from the cylindrical part 11, as rotated by making use of the knurls 14b, the valve body 16 can be pulled out in consequence of the removal of the cap 14 for the purpose of inspecting and cleaning the interior of the main valve 28 or inspecting and cleaning the valve body 16. The attachment of the valve body 16 to the interior of the valve chamber 10 can be attained in consequence of the setting of the cap 16 to the cylindrical part 11 of the valve chamber 10. The valve body 16 can be seated properly in position by simply rotating the cap 14 by the use of the knurls 14b while retaining the annular projecting part 33 in alignment with annular engaging part 34. The cap 14 exhibits an excellent ability of attachment and detachment and, when the vent valve encounters a mechanical trouble, permits easy removal of extraneous matter such as dirt during the inspection of the components of the main valve.

Since the depressed part 14a is formed on the lower peripherry of the cap 14 and the sealing member (O ring) 39 is disposed in this depressed part 14a, the cap 14 can be easily and infallibly attached to and detached from the interior of the valve chamber 10 with persistent seal tightness, approximated closely to the opening part 11a of the main valve 28. Further, the seal tightness can be increased because the cap 14 is attached by rotation in to the present embodiment. It may be otherwise accomplished by forming a projected or depressed portion on the outer periphery of the cap 14, a depressed or projected portion on the inner periphery of the main valve 28, and bringing these portions into engagement by rotating the cap 14 or by implementing the attachment or detachment by means of a screw. Further, by utilizing the sealing member 39 in retaining the seal tightness of the valve chamber 10, the cap 14 can be attached to or detached from the main valve 28 by the use of a varying means of engagement besides the means resorting to rotation.

Incidentally, the main valve 28 as described above contemplates disposing the main valve 28 and the connecting cylindrical part 26 in a state having their axes deviate from each other. This invention does not need to limit the valve to this particular construction, but may allow it to assume a varying construction in which the main valve and the connecting cylindrical part have their axes coincide with each other. The construction is arbitrary, depending on the mode of actual application.

It is clear from the description given above that this invention, when forming the vent valve of a synthetic resin, allows the vent valve to be formed by the use of a simple two plate type metal die, and consequently permits a reduction in the cost of the metal die. Further, since the valve chamber does not need to be formed as with a separate housing and has no possibility of being accidentally disassembled, it obviates the necessity of effecting union of relevant parts by adhesion and permits a cut in the number of operational steps or in the cost of production.

By integrating the whole construction of the vent valve including the valve chamber, it is made possible to assemble component parts of large sizes into one mass and allows a decrease in the cost of the metal die. The possibility of the dew drops leaking from the vent valve is eliminated because the part of the valve chamber connected to the cap is located in the upper terminal part of the valve chamber. The vent valve exhibits high airtightness and has no possibility of producing a defective operation or leaking an offensive odor during the presence of a weak negative pressure, because the connecting part of the valve chamber is covered by the inner part of the insulating member.

Moreover, the possibility of the vent valve leaking an offensive odor is nil because the annular valve seat is capable of completely retaining the annular circular shape, and consequently the flexible member of the valve body enjoys a good following property.

Further, since the vent valve of this invention is enabled to be joined to the upper end of the vent pipe as approximated closely to the wall surface, the uptight waste pipe and the vent pipe can be installed in the proximity of the wall surface and the space for installation can be utilized effectively. Particularly when the vent valve according to this invention is joined to the upper end of the vent pipe intended for discharge of water, the influence of obstacles such as concealing parts can be avoided because the vent pipe can be set at a suitable position as adjusted in posture.

The vent valve of this invention, when the valve is worn out, does not need to be wholly replaced with a new one. Thus, this invention is capable of providing a vent valve which allows very easy disassemblage and reassemblage of itself and permits the mechanism in the valve to be easily cleaned and replaced with a new one. The vent valve provided by this invention comprises a small number of component parts, manifests a good tightness of seal, and has the merit that a small space suffices for the installation.

Further, the vent valve of this invention cannot leak the dew drops collecting therein to the exterior thereof and, even when the dew drops collecting therein freeze, can be disassembed without being affected by the frozen dew drops.

What is claimed is:

1. A vent valve comprising a main valve having a valve chamber provided therein with an inside annular valve seat and an outside annular valve seat, a valve body normally seated on said seats under its own weight and opened by atmospheric pressure in response to negative pressure, a water collecting groove formed outward of said outside annular valve seat, a connecting cylindrical part provided at a position deviating from an axis of said valve chamber for communicating with said valve chamber, and a communicating flow path formed along the axial direction of said valve chamber for allowing communication between said water collecting groove and an interior of said connecting cylindrical part.

2. A vent valve according to claim 1, wherein said communicating flow path is disposed past a part wherein said water collecting groove overlaps an inside diameter part of said connecting cylindrical part.

3. A vent valve according to claim 1, wherein said water collecting groove is inclined downward toward said communicating flow path.

4. A vent valve according to claim 2, wherein said water collecting groove is inclined downward toward said communicating flow path.

5. A vent valve according to claim 1, wherein said main valve is provided with a cap freely attachable thereto or detachable therefrom, the valve body elevates in said valve chamber to open the vent valve and descends in said valve chamber to close the vent valve, and said valve body is attachable to or detachable from the vent valve while accompanying said cap when said cap is detached from the main valve.

6. A vent valve according to claim 2, wherein said main valve is provided with a cap freely attachable thereto or detachable therefrom, the valve body elevates in said valve chamber to open the vent valve and descends in said valve chamber to close the vent valve, and said valve body is attachable to or detachable from the vent valve while a accompanying said cap when said cap is detached from the main valve.

7. A vent valve according to claim 3, wherein said main valve is provided with a cap freely attachable thereto or detachable therefrom, the valve body elevates in said valve chamber to open the vent valve and descends in said valve chamber to close the vent valve, and said valve body is attachable to or detachable from the vent valve while accompanying said cap when said cap is detached from the main valve.

8. A vent valve according to claim 4, wherein said main valve is provided with a cap freely attachable thereto or detachable therefrom, the valve body elevates in said valve chamber to open the vent valve and descends in said valve chamber to close the vent valve, and said valve body is attachable to or detachable from the vent valve while accompanying said cap when said cap is detached from the main valve.

9. A vent valve according to claim 5, wherein said cap has a guide shaft, said valve body is formed with a guide hole, and said guide shaft is inserted and snap-fitted in said guide hole and engaged with said valve body when said cap is detached from said main valve.

10. A vent valve according to claim 6, wherein said cap has a guide shaft, said valve body is formed with a guide hole, and said guide shaft is inserted and snap-fitted in said guide hole and engaged with said valve body when said cap is detached from said main valve.

11. A vent valve according to claim 7, wherein said cap has a guide shaft, said valve body is formed with a guide hole, and said guide shaft is inserted and snap-fitted in said guide hole and engaged with said valve body when said cap is detached from said main valve.

12. A vent valve according to claim 8, wherein said cap has a guide shaft, said valve body is formed with a guide hole, and said guide shaft is inserted and snap-fitted in said guide hole and engaged with said valve body when said cap is detached from said main valve.

13. A vent valve according to claim 5, wherein said main valve is provided in an upper part thereof with engaging means, and said cap is inserted in the axial direction of said valve chamber and is engageable with and disengageable from said engaging means by being rotated.

14. A vent valve according to claim 6, wherein said main valve is provided in an upper part thereof with engaging means, and said cap is inserted in the axial direction of said valve chamber and is engageable with and disengageable from said engaging means by being rotated.

15. A vent valve according to claim 7, wherein said main valve is provided in an upper part thereof with engaging means, and said cap is inserted in the axial direction of said valve chamber and is engageable with and disengageable from said engaging means by being rotated.

16. A vent valve according to claim 8, wherein said main valve is provided in an upper part thereof with engaging means, and said cap is inserted in the axial direction of said valve chamber and is engageable with and disengageable from said engaging means by being rotated.

17. A vent valve according to claim 9, wherein said main valve is provided in an upper part thereof with engaging means, and said cap is inserted in the axial direction of said valve chamber and is engageable with and disengageable from said engaging means by being rotated.

18. A vent valve according to claim 10, wherein said main valve is provided in an upper part thereof with engaging means, and said cap is inserted in the axial direction of said valve chamber and is engageable with and disengageable from said engaging means by being rotated.

19. A vent valve according to claim 11, wherein said main valve is provided in an upper part thereof with engaging means, and said cap is inserted in the axial direction of said valve chamber and is engageable with and disengageable from said engaging means by being rotated.

20. A vent valve according to claim 12, wherein said main valve is provided in an upper part thereof with engaging means, and said cap is inserted in the axial direction of said valve chamber and is engageable with and disengageable from said engaging means by being rotated.

21. A vent valve according to claim 13, wherein said cap and an inner peripheral surface of said valve chamber have a sealing member including an O ring mounted therebetween.

22. A vent valve according to claim 14, wherein said cap and an inner peripheral surface of said valve chamber have a sealing member including an O ring mounted therebetween.

23. A vent valve according to claim 15, wherein said cap and an inner peripheral surface of said valve chamber have a sealing member including an O ring mounted therebetween.

24. A vent valve according to claim 16, wherein said cap and an inner peripheral surface of said valve chamber have a sealing member including an O ring mounted therebetween.

25. A vent valve according to claim 17, wherein said cap and an inner peripheral surface of said valve chamber have a sealing member including an O ring mounted therebetween.

26. A vent valve according to claim 18, wherein said cap and an inner peripheral surface of said valve chamber have a sealing member including an O ring mounted therebetween.

27. A vent valve according to claim 19, wherein said cap and an inner peripheral surface of said valve chamber have a sealing member including an O ring mounted therebetween.

28. A vent valve according to claim 20, wherein said cap and an inner peripheral surface of said valve chamber have a sealing member including an O ring mounted therebetween.

\* \* \* \* \*

UNITED STATES PATENT AND TRADEMARK OFFICE
CERTIFICATE OF CORRECTION

PATENT NO.     : 6,308,731 B1
DATED          : October 30, 2001
INVENTOR(S)    : Koichi Kawasaki It is certified that error appears in the above-identified patent and that said Letters Patent is hereby corrected as shown below:

<u>Title page,</u>
Item [73], please change "ITZ" to -- KITZ -- and please change "Iba-Ken" to -- Chiba-Ken --.

Signed and Sealed this

Twenty-sixth Day of March, 2002

*Attest:*

JAMES E. ROGAN
*Attesting Officer*     *Director of the United States Patent and Trademark Office*